United States Patent [19]
Theodorsen et al.

[11] Patent Number: 5,100,056
[45] Date of Patent: Mar. 31, 1992

[54] AUTOMATIC VOLUME CONTROLLED SEQUENTIAL WATERING SYSTEM AND VALVE THEREFOR

[76] Inventors: Theodore E. Theodorsen; Theodore J. Theodorsen, both of 56 Old Ox Rd., Manhasset, N.Y. 11030

[21] Appl. No.: 358,891

[22] Filed: May 30, 1989

[51] Int. Cl.⁵ .............................................. B05B 12/04
[52] U.S. Cl. ............................. 239/63; 239/DIG. 15; 239/66
[58] Field of Search ................... 249/80, 83; 239/DIG. 15, 63-65, 66

[56] References Cited

U.S. PATENT DOCUMENTS

| | | | |
|---|---|---|---|
| 704,211 | 7/1902 | Rathbun | 239/63 |
| 1,812,586 | 6/1931 | Elder | 239/DIG. 15 X |
| 2,642,076 | 6/1953 | Tigert et al. | 239/DIG. 15 X |
| 3,529,618 | 9/1970 | Rinkovich | 239/DIG. 15 X |
| 3,782,630 | 1/1974 | Sabo | 239/70 |
| 3,782,633 | 1/1974 | Nyc | 239/191 |
| 3,912,167 | 10/1975 | Simon | 239/60 |
| 4,019,686 | 4/1977 | Palma | 239/205 |
| 4,023,585 | 5/1977 | VandenBurg | 137/80 |
| 4,085,769 | 4/1978 | van Haafton | 137/119 |
| 4,114,647 | 9/1978 | Sturman et al. | 137/624.1 |
| 4,241,375 | 12/1980 | Ruggles | 361/166 |
| 4,253,606 | 3/1981 | Johnson | 239/63 |
| 4,548,225 | 10/1985 | Busalacchi | 137/78.3 |

OTHER PUBLICATIONS

Melnor 1989 Lawn & Garden Catalog, p. 6.
Garden & Greenhouse advertisement, "This Computer Makes it Rain When You Say So".
"Celebrating Twenty-Five Years!", Melnor, Brad Bambarger.
"Built-In Timers give No-Waste Watering".
Lawn & Garden Marketing, Aug. 1987, "Catching the Wave", p. 14, 16, 22.
Lawn & Garden Marketing, Feb. 1983, "DIY Irrigation", p. 20.
Various "Yellow Pages" Advertisements.
Various "Thomas Register," 1987 Advertisements.

*Primary Examiner*—Andres Kashnikow
*Assistant Examiner*—Kevin Weldon
*Attorney, Agent, or Firm*—Curtis, Morris & Safford

[57] ABSTRACT

An automatic volume controlled sequential irrigation system and automatic volume controlled irrigation valve therefor includes an inlet port connectable to a source of pressurized water, a discharge port, a bypass port, a valve in the discharge port movable between an open position and a closed position and a valve in the bypass port movable between a closed position and an opened position. The irrigation valve also includes a mechanism for selecting a predetermined volume of water to be discharged from the discharge port which measures the volume of water discharged from the discharge. When a predetermined volume of water has passed through the discharge port, the discharge valve moves from the open position to the closed position and the bypass valve moves from the closed position to the open position.

19 Claims, 6 Drawing Sheets

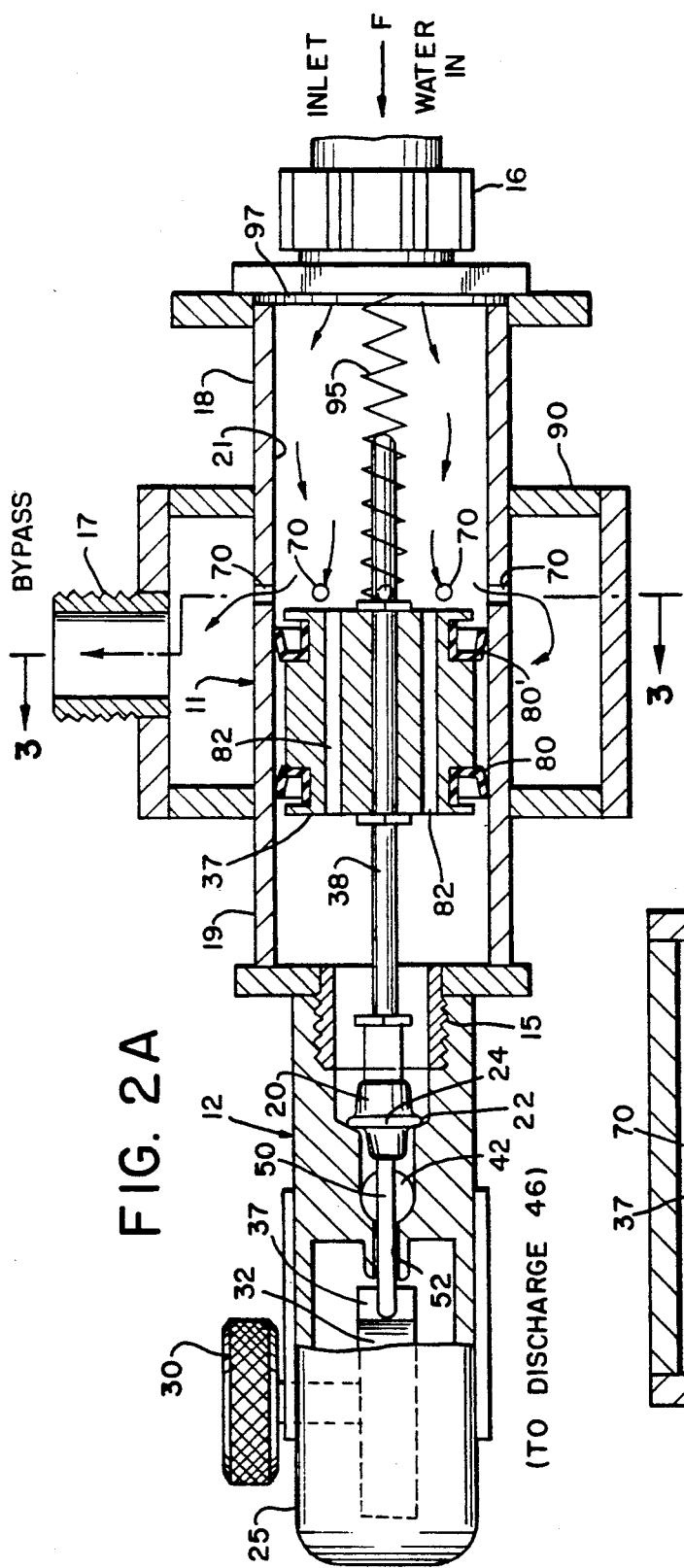
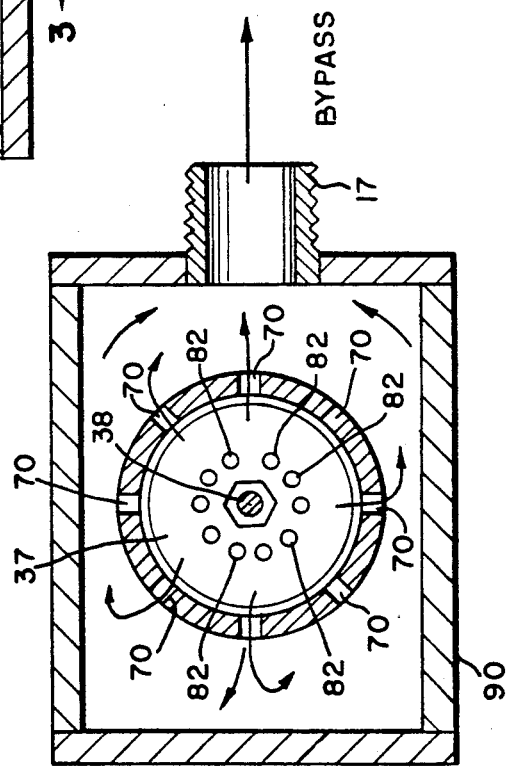
FIG. 2A
FIG. 3

AUTOMATIC VOLUME CONTROLLED SEQUENTIAL WATERING SYSTEM AND VALVE THEREFOR

FIELD OF THE INVENTION

This invention relates to volume controlled automatic irrigation valves and to irrigation systems incorporating such valves.

Irrigation of lawns, gardens and the like is generally accomplished by either fixed underground piping and sprinkler systems, or by a simple garden hose and sprinkler head. The common garden hose and sprinkler head arrangement is simple and inexpensive, but inconvenient. The coverage of a garden hose—type sprinkler head is usually limited to a portion of the area to be watered. Connection of more than one sprinkler head to a given spigot, or to other spigots on the same house to effect simultaneous water sprinkling to attempt to cover a larger area at one time is not generally feasible because significant pressure loss reduces the coverage of each sprinkler head. Thus, the conventional garden hose and sprinkler head arrangement requires constant attention by the homeowner during watering. It must be manually repositioned after only a portion of the area is watered.

Some attempts have been made to minimize the amount of attention required and provide means for determining the volume of water discharged from a sprinkler. In one device, a sprinkler head incorporates an integral watermeter or an in-series watermeter for measuring the volume of water discharged. The number of gallons desired to be discharged during a watering cycle is first set on the device by the user. This action opens an internal discharge valve in the device. The spigot is then opened and the watering cycle commences. After the preset amount of water has been discharged through the sprinkler head with the watermeter a cam connected between the watermeter and the water input automatically closes the valve, terminating the watering cycle. Although this device minimizes the potential for under or over watering in the event of inattention of the person responsible for the watering, the person must still physically move the sprinkler head to the next location after the watering cycle is complete and must be in attendance or nearby for that purpose.

A timer controlled sequential watering system has also been proposed. In this system, a plurality of rotary, swinging door-type three-way valves in association with a sprinkler head are connected in series. Each valve is provided with a timer, not a watermeter, which can be preset to operate for a period of time, a discharge outlet to a sprinkler head, and a bypass outlet which may be connected to the inlet of another timer actuated valve of the same type. Each of the valves includes a flapper mechanism for detecting the initiation of water discharging through the discharge outlet (to the sprinkler head), which starts the timer.

To use this system, the swinging door of each valve is set so that the discharge is open and the bypass closed. The timer on each valve is then set for the desired amount of time and the supply water turned on to the first valve of the series. When time for this valve has elapsed, the timer moves the swinging door valve to close the discharge and open the bypass, allowing water to flow to the next valve in the series. Water then flows through the discharge of the second valve, moving the flapper and initiating the timer for this valve. This valve then operates in the same manner as for the first valve. Other similar valves may also be provided in series.

Despite the advantages presented by this proposal, the rotary swinging door valve may be troublesome and prone to sticking. Furthermore, it may be costly to manufacture and must close against pressure. The timer must also be actuated both to start and to stop flow. Furthermore, the timer does not measure volume of water discharged, and therefore is subject to variation depending on variations in house water pressure. The variation in house water pressure is mainly due to the rate at which water is currently being used by the neighbors in the immediate area. This problem can be particularly acute at times of water shortage where lawn watering is restricted to certain hours of the day. This can lead to overwatering or underwatering with unpredictable results.

Accordingly, it can be seen that there is a need for means for sequential irrigation of a large area by a garden hose and sprinkler arrangement, without significant water volume variation even if there are variations in the water pressure without requiring supervision once the water supply has been turned on.

It is a further object to provide a watermeter actuated automatic irrigation valve permitting sequential automatic actuation of a number of valves in a series, each valve being set to discharge into a sprinkler head or the like a preset volume of water and then to terminate the discharge and open a bypass, permitting water flow to the next valve in the series.

SUMMARY OF THE INVENTION

These and other objects are achieved in a preferred embodiment of the present invention wherein an automatic water irrigation valve is provided with an inlet port connectable to a source of pressurized water, a discharge port and a bypass port. Valve means are provided in the discharge port movable between an open position and a closed position, and valve means are provided in the bypass port movable between a closed position and an opened position. The irrigation valve also includes means for selecting a predetermined volume of water to be discharged from the discharge port, and means in the discharge port for measuring the volume of water discharged from the discharge port. The irrigation valve also includes actuating means operatively connected between the volume measuring means and the discharge valve means to move the discharge valve means from the open position to the closed position and to move the bypass valve means from the closed position to the open position after the predetermined volume of water has exited the discharge port.

In another preferred embodiment of the present invention, such automatic irrigation valves are connected together in series, and operate sequentially so that water flowing out the bypass port of the preceding valve in the series enters the inlet port of the next valve in the series, thus commencing the discharge cycle for the next valve in the series upon the termination of the discharge cycle of the previous valve.

BRIEF DESCRIPTION OF THE DRAWINGS

The above and other objects, features and advantages of the present invention will be apparent from the following detailed description of illustrative embodiments thereof which is to be read in conjunction with the accompanying drawings, wherein:

FIG. 2A is an elevational cut-away view similar to FIG. 2, but showing the discharge valve in the closed position and the bypass valve in the open position;

FIG. 3 is a sectional view of the bypass valve portion of the present invention taken along the line 3—3 of FIG. 2A.

DETAILED DESCRIPTION

Figure 1:
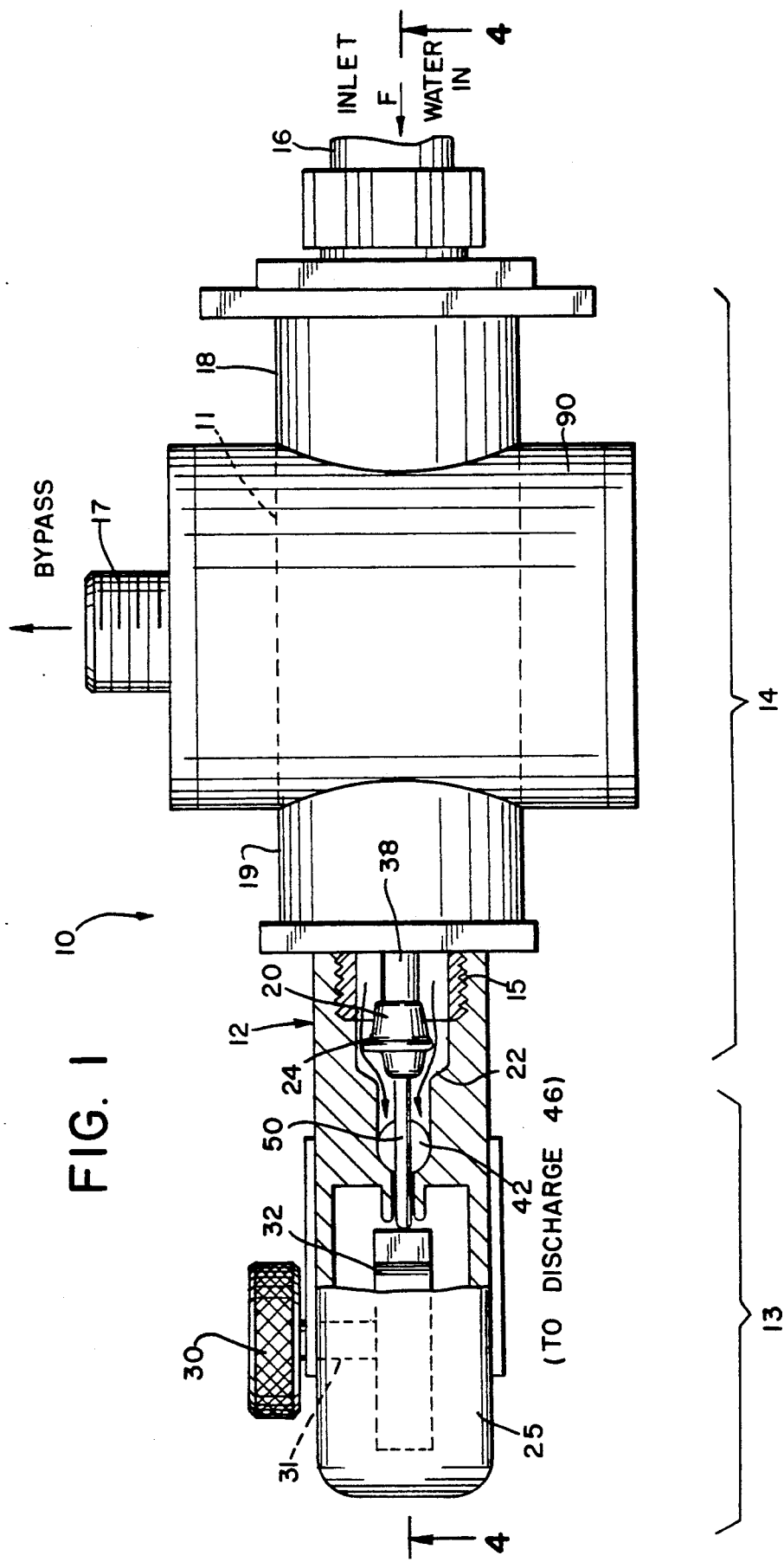
FIG. 1 is an elevational view of the exterior of an automatic water irrigation valve in accordance with a preferred embodiment of the present invention, including a partially cut-away view of the cam follower section of the volume control means, shown with the discharge valve in the open position.
Figure 2:
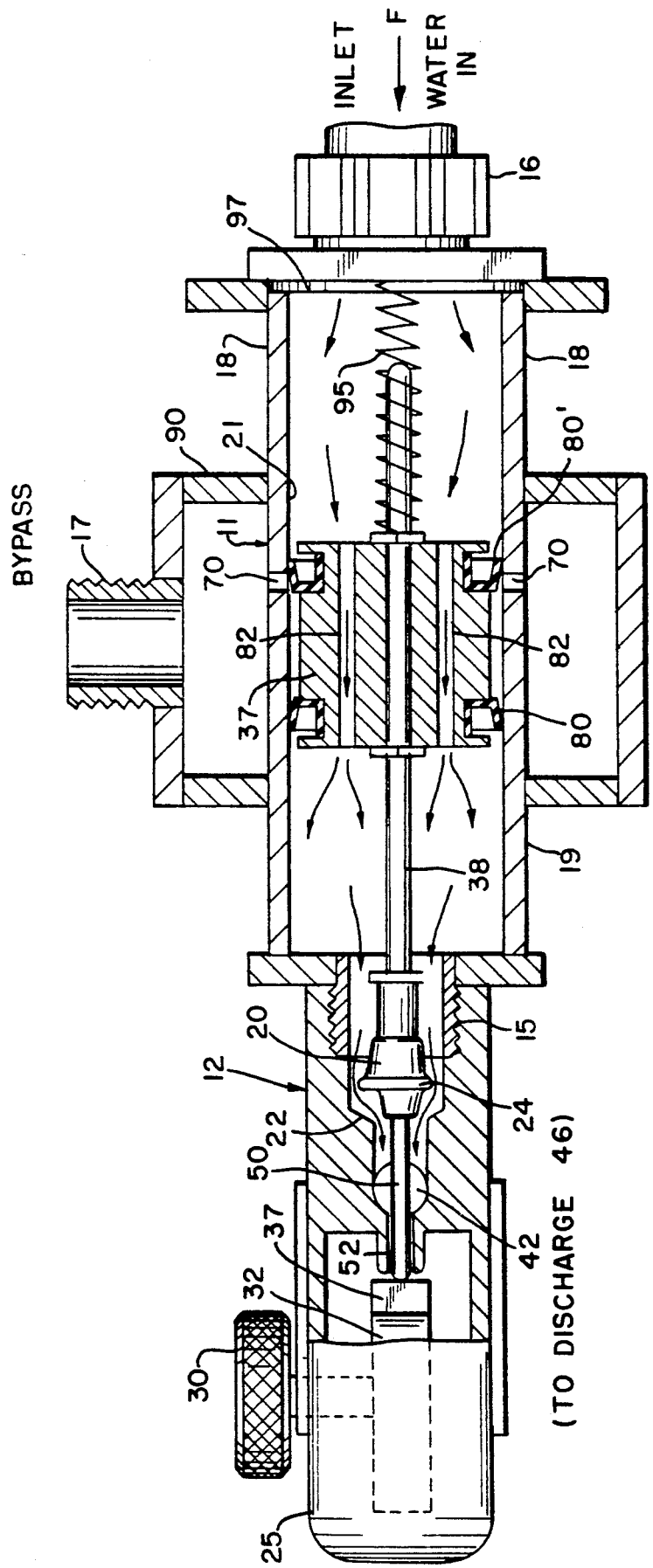
FIG. 2 is an elevational cut-away view of the valve and cam follower portion of the automatic water irrigation valve depicted in FIG. 1, showing the discharge valve in the open position and the bypass valve in the closed position.

Referring now to the drawings in detail, and initially to FIG. 1 thereof, an automatic volume controlled irrigation valve 10 in accordance with a preferred embodiment of the present invention is depicted. Irrigation valve 10 includes a valve section 14 and a volume control mechanism portion 13. Valve section 14 includes a bypass valve portion 11 and a discharge valve portion 12. Bypass valve portion 11 is preferably attached to discharge valve portion 12 by threaded connection 15, and discharge valve portion 12 is, in turn, preferably integrally connected to volume control portion 13. Of course, other connection means could be also employed. For example, bypass valve portion 11, discharge valve portion 12 and volume control portion 13 could all be fabricated as a single piece by molding, casting, or other convenient means, or could be glued or welded together.

Irrigation valve 10 includes an inlet 16, which is preferably a conventional female hose fitting of the type used with common house garden hoses and adapted to be connected to a source of pressurized water, such as common household or garden water supplies. Irrigation valve 10 also includes a bypass outlet 17 and a discharge outlet 46, which are preferably male ended fittings to which a female end of a common garden hose coupling may be connected. Irrigation valve 10 also includes an inlet conduit 18 and a discharge conduit 19 for conducting water, respectively, from the inlet 16 to the bypass valve portion 11 and from bypass valve portion 11 towards the discharge valve portion 12.

Volume control portion 13 includes a housing 25 which encloses reduction gearing and a water volume measuring mechanism. A hand wheel 30 is provided on the outside of housing 25, the position of which may be set by the user for the desired quantity of water to be allowed to discharge during a single cycle. Hand wheel 30 is connected to a cam 32 by means of axle 31. Thus, turning hand wheel 30 causes a corresponding movement of cam 32 which, in turn, controls the position of the discharge valve and the bypass valve in the manner described in detail below. As depicted in FIG. 1, the discharge valve plug 20 is in its open position, away from its seat 22.

Figure 4:
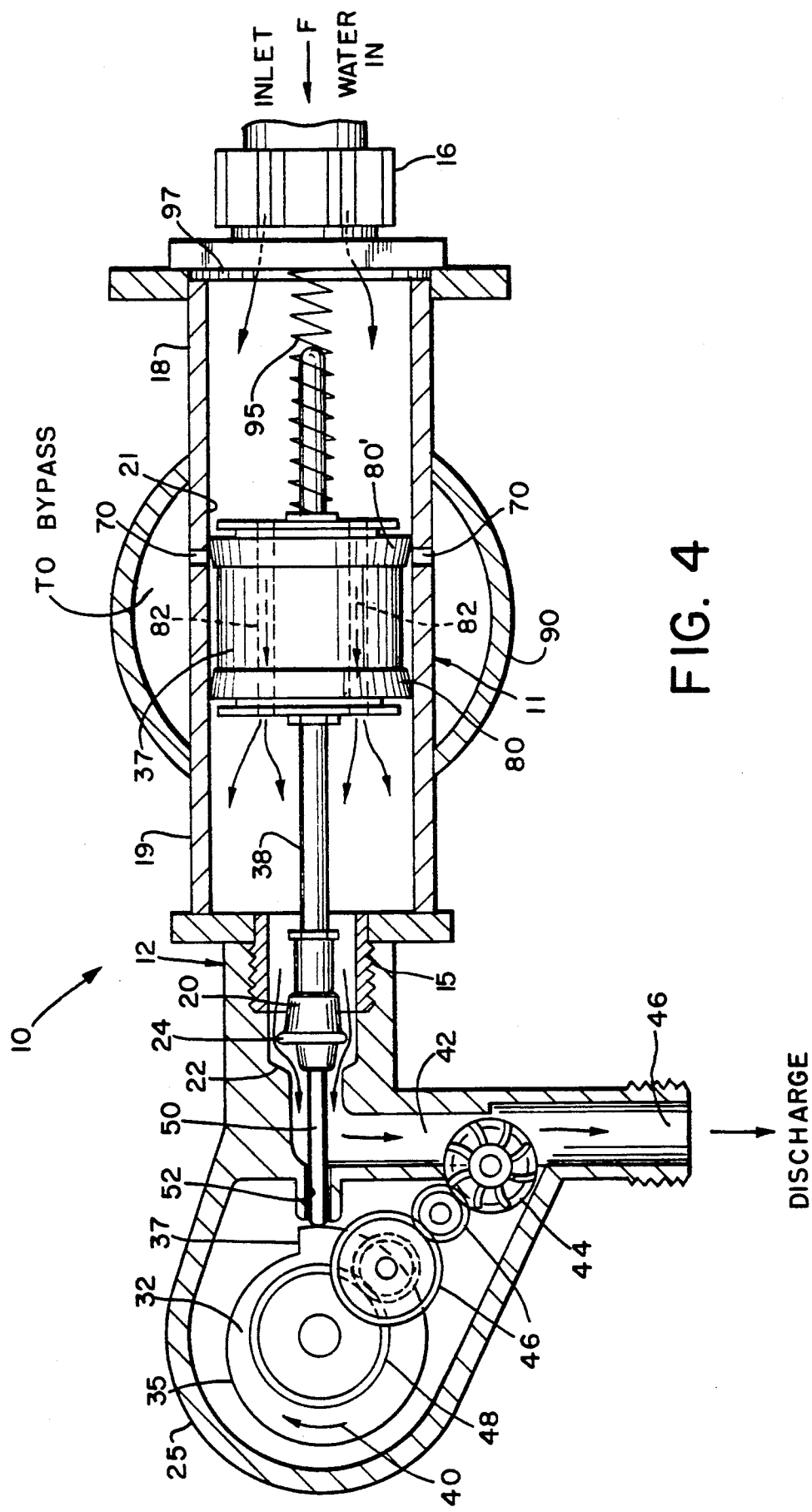
FIG. 4 is a sectional view of a preferred embodiment of the present invention taken along the line 4—4 of FIG. 1, showing the discharge valve in the open position and the bypass valve in the closed position.

Turning now to FIGS. 4, 4A, 2 and 2A, and initially to FIG. 4 thereof, the internal construction and operation of the automatic volume controlled irrigation valve of the present invention will be described in detail.

Discharge valve plug 20 is adapted to move axially into and out of engagement with valve seat 22. For purposes of the present application, a valve with such an arrangement is referred to as a "globe valve". An O-ring 24 is provided on the sealing face of valve plug 20 to form a watertight seal when valve plug 20 is seated in engagement with valve seat 22. As depicted in FIG. 4 (and FIG. 2), valve plug 20 is away from its seat, in its open position.

Bypass valve portion 11 includes a cylinder 21 and a spool 37 centrally disposed within cylinder 21 and longitudinally and reciprocally slidable within it. Spool 37 is preferably operatively connected to discharge valve plug 20 by means of bypass valve operating shaft 38. Cylinder 21 has a plurality of radial holes 70 extending though it and into a bypass conduit 90. Conduit 90, in turn, leads to bypass outlet 17, to which a hose or other conduit may be connected to lead to another automatic irrigation valve.

Spool 37 includes through-holes 82 permitting water to flow from inlet conduit 18 into discharge conduit 19. Through-holes 82 are always open. Thus, water pressure within inlet conduit 18 is always substantially balanced with water pressure in discharge conduit 19 with discharge valve plug 20 in its open position, neglecting effects of relatively small pressure drop due to flow through through-holes 82.

Spool 37 includes U-seals 80 and 80' at its downstream and upstream ends, respectively. U-seals are preferred because they offer effective sealing, with relatively low friction. However, other sealing means, such as V-seals or O-rings, could be employed if desired. As depicted in FIG. 4 (and FIG. 2), spool 37 is positioned with U-seal 80' upstream of radial holes 70 and U-seal 80 positioned downstream of radial holes 70. Thus, water cannot flow into conduit 90 leading to bypass outlet 17, that is, the bypass valve is in the closed position. Water can, however, flow through through-holes 82 to the downstream side of spool valve 37, and hence into discharge portion 19 of cylinder 21, which leads to discharge valve body portion 12.

To control the position of valve plug 20 and spool 37, cam 32 of the volume controller has a generally curved region 35 and a step region 37. A valve follower rod 50 is provided to follow the outside surface of cam 32 as it rotates. Cam follower 50 preferably is a longitudinal rod which is slidably fitted in a hole 52 extending between discharge conduit 42 and the volume control mechanism. It should be noted that it is not necessary for valve follower 50 to be sealed within hole 52 to prevent leakage between discharge conduit 42 and the volume control mechanism, because the volume control housing 25 itself is sealed. All parts of the volume control mechanism are preferably made of materials which will not degrade in contact with water, such as nylon, polypropylene, other plastics, brass or stainless steel.

To measure the volume of water discharged, a water wheel 44 is provided in discharge conduit 42. Water wheel 44 is connected to cam 32 by means of reduction gearing comprising gears 46 and cam drive gear 48. The effect of the reduction gears 46 and cam drive gear 48 is to permit water wheel 44 to rotate relatively freely and rapidly, and to ultimately cause cam 32 to rotate relatively slowly in a clockwise direction as indicated by arrow 40, in direct proportion to the rotation of water wheel 44, and hence in direct proportion to the volume of water discharged through discharge conduit 42.

As depicted in FIG. 4, spool 37 is positioned so that radial holes 70 to the bypass conduit 90 are blocked, and valve plug 20 is held away from seat 22 by means of valve follower 50 riding against cam surface 35 of cam 32. Thus, when water to inlet 16 is turned on, water can flow though through-holes 82, past discharge valve plug 20, into discharge conduit 42, rotating water wheel 44 and then out the discharge outlet to a sprinkling or irrigation device of conventional construction, as indicated by the flow arrows. There is no need to include a separate mechanism to actuate the volume control mechanism at the start of the watering cycle, as is the case with prior art sequential watering devices utilizing timers, because the flow of water past the water wheel 44 automatically and directly causes the volume measuring when water starts to flow, and continues as long as flow is present.

Figure 4A:
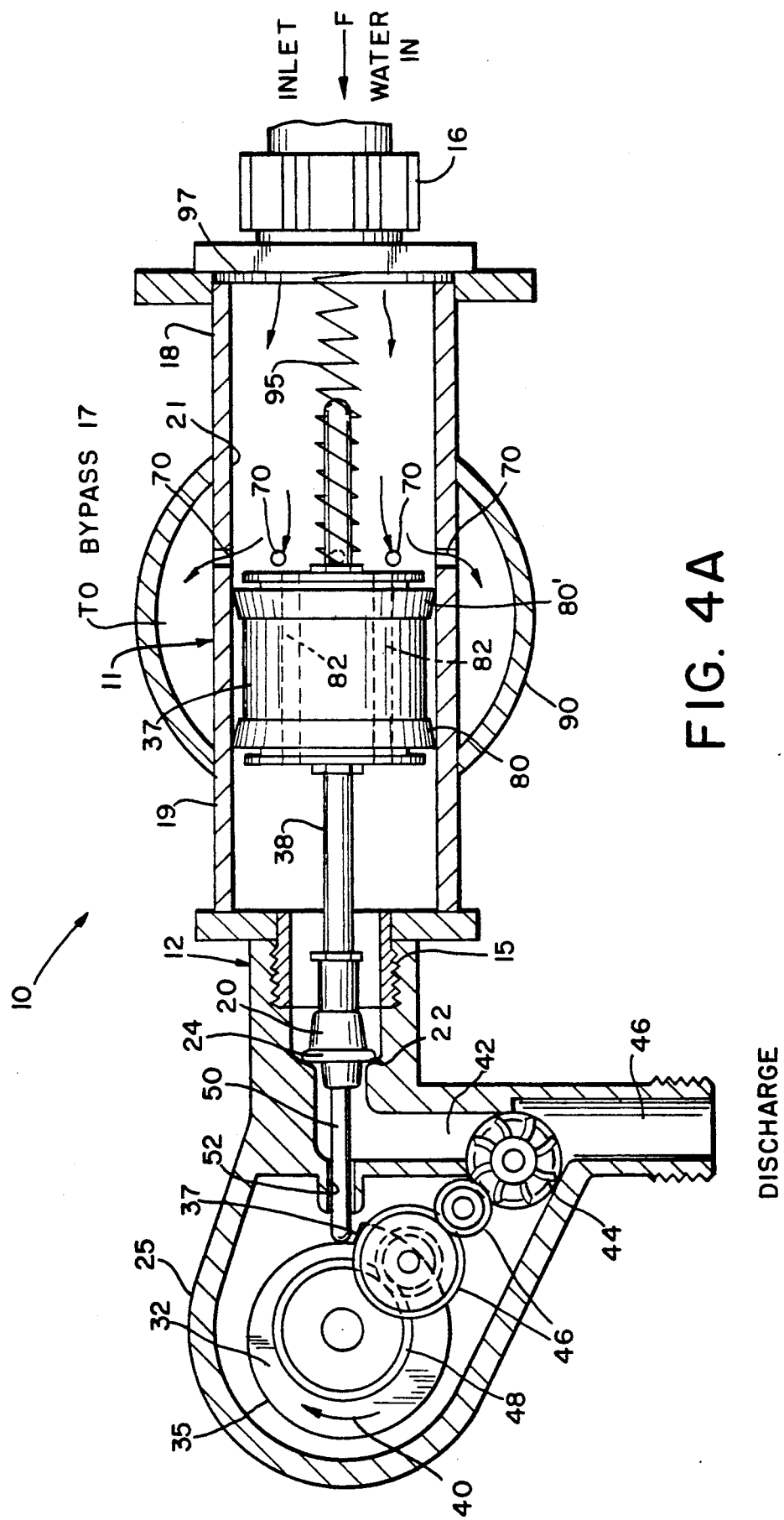
FIG. 4A is a sectional view, similar to FIG. 4, showing the discharge valve in the closed position and the bypass valve in the open position.

As water water wheel 44 turns, the reduction gearing 6 and cam gear 48 will cause cam 32 to slowly rotate clockwise, as indicated by arrow 40, until cam 32 has rotated to the position depicted in FIG. 4A and 2A. As depicted therein, cam follower 50 has moved axially into the step region 37 of cam 32, causing discharge valve plug 20 to seat against valve seat 22, closing the discharge valve. This, of course, stops the motion of water wheel 44 and terminates the discharge of water through the discharge outlet 46. A spring 95 is preferably provided on the upstream side of spool valve 37 to urge discharge valve plug 20 and spool valve 37 into, respectively, their closed and open positions. Spring 95 helps to overcome the friction of seals 80 and 80'. Spring 95 is conveniently supported at its opposite end by spring support 97, which is perforated to allow water to flow though it relatively unimpeded.

Cam follower 50, discharge valve plug 20 and bypass spool 37 are preferably connected to a common shaft 38. Thus, plug 20 and spool 37 will move together as a unit substantially simultaneously so that, as the discharge port is being closed, the bypass port is being opened. That is, as plug 20 closes the discharge port, spool 37 moves to the left, uncovering radial holes 70 leading to the bypass outlet Since water cannot pass through through-holes 82 into the discharge portion 19 because the discharge valve is closed, water in the inlet portion 18 of cylinder 21 passes through holes 70 into the bypass conduit 90, and hence out through bypass outlet 17. From bypass outlet 17, the water then flows though a hose or other conduit to the inlet of the next irrigation valve in the series.

Figure 5:
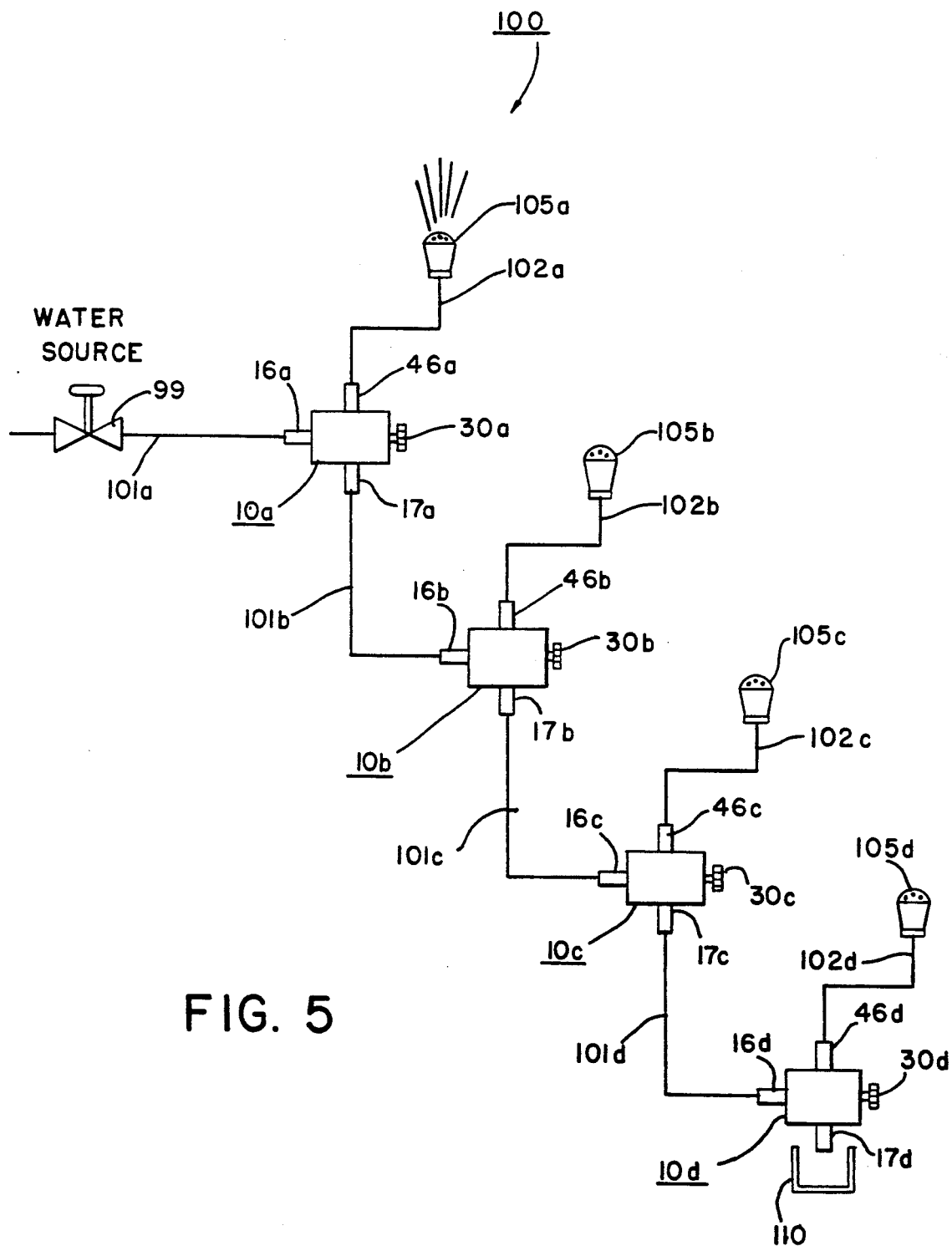
FIG. 5 is a schematic of an automatic sequential water irrigation system in accordance with a preferred embodiment of the present invention.

Turning now to FIG. 5, an automatic volume controlled sequential water irrigation system 100 employing four automatic volume controlled irrigation valves (10a, 10b, 10c and 10d) in accordance with the present invention is schematically depicted. Although four irrigation valves are depicted, it is to be understood that any number of valves 10a, 10b etc. could be employed.

The first valve in the series, valve 10a has an inlet 16a, a discharge outlet 46a and a bypass outlet 17a. Inlet 16a is connected to a conduit 101a, which may be a common garden hose, to a spigot 99. Discharge outlet 46a is connected to a conduit 102a leading to an irrigation device 105a, such as a sprinkler. Bypass outlet 17a is connected to a conduit 101b, which is in turn connected to the inlet 16b of the next valve in the series, valve 10b. Valve 10b is constructed and connected in like manner to valve 10a, with its discharge outlet 46b leading to an irrigation device 105b and its bypass outlet 17b leading to the inlet 16c of the next valve in the series, valve 10c, though conduit 101c. Valve 10c is connected and arranged in the same manner. The last valve in the series, valve 10d, is also connected and arranged in the same manner, except that the bypass outlet 17d is capped off by cap 110.

To operate system 100, the user first sets the volume control mechanism of each of the valves to the desired setting by means of hand wheels 30a, 30b etc. Once the volume control mechanism is set for each valve, the discharge port of each valve will be open and the bypass port will be closed. Of course, if desired, any valve in the system can be set so that the discharge port is closed and the bypass open. If this is done, the discharge of that valve will remain closed and the bypass will remain open so that the valve functions simply as an extension of the conduits 101a, 101b etc.

When it is desired to commence the watering sequence, water to the system is turned on by means of spigot 99, either manually or by a timer or remote control. As soon as the water is turned on, water will discharge through discharge outlet 46a, into conduit 102a, and out irrigation device 105a, while the volume discharged is measured by the volume measuring and control device in the valve (not shown in FIG. 5). This continues until the desired volume of water set by the user has discharged from the valve. When this occurs, the discharge port of valve 10a will close and the bypass port will open, terminating discharge of water from the irrigation device 105a and allowing water to flow from bypass outlet 17a into conduit 101b, and into the inlet 16b of valve 10b.

Once water is allowed to flow into the inlet 16b of valve 10b, water will discharge through discharge outlet 46b, into conduit 102b, and out irrigation device 105b, while the volume discharged is measured by the volume measuring and control device in the valve, in the same manner as for valve 10a. This continues until the desired volume of water set by the user has discharged from this valve. When this occurs, the discharge port of valve 10b will close and the bypass port will open, terminating discharge of water from the irrigation device 105b and allowing water to flow from bypass outlet 17c into conduit 101c, and into the inlet 16c of valve 10c. The same cycle is then repeated for valve 10c, and for any other valves in the series.

The last valve in the series, valve 10d, is constructed and arranged in the same way as the other valves, except that the bypass outlet 17d is capped off by cap 110. The last irrigation valve in the series can also be a conventional two-way volume controlled irrigation valve. Thus, when the desired volume has been discharged, the discharge port will close and the watering sequence will terminate.

Accordingly, it can be seen that the foregoing invention provides a simple and convenient means for automatic sequential volume controlled irrigation of a large area by a garden hose and sprinkler arrangement, without significant water volume variation even if there are variations in the water pressure, and without requiring supervision once the water supply has been turned on.

The terms which have been employed herein in describing preferred embodiments of the present invention are terms of expression and not of limitation, and there is no intention in the use of such terms of limiting the invention to only the preferred embodiments of the present invention shown and described.

What is claimed is:

1. An automatic water irrigation valve comprising;
   an inlet port connectable to a source of pressurized water,
   a discharge port,
   a bypass port,
   valve means in said discharge port movable between an open position and a closed position,
   valve means in said bypass port movable between a closed position and an open position,
   means for selecting a predetermined volume of water to be discharged from said discharge port,
   means in said discharge port for measuring the volume of water discharged from said discharge port, and
   actuating means operatively connected between said volume measuring means and said discharge valve means to move said discharge valve means from said open position to said closed position and to move said bypass valve means from said closed position to said open position,
   said valve means in said discharge port and said valve means in said bypass port being cooperatively interrelated after setting said predetermined volume of water to preclude discharge of water from said bypass port until said predetermined volume of water has exited said discharge port.

2. The automatic water irrigation valve defined in claim 1, wherein said discharge valve is so arranged in said discharge port that pressure upstream of said discharge valve means acts in a direction tending to maintain said discharge valve means in its closed position after said valve has closed.

3. The automatic water irrigation valve defined in claim 1, wherein said bypass valve means is substantially pressure balanced in its closed position.

4. The automatic water irrigation valve defined in claim 1, wherein said discharge valve is so arranged in said discharge port that pressure upstream of said discharge valve means acts in a direction tending to maintain said discharge valve means in its closed position after closing and wherein said bypass valve means is substantially pressure balanced in its closed position.

5. The automatic water irrigation valve defined in claim 4, wherein said discharge valve means and said bypass valve means are mechanically connected together so that said pressure upstream of said discharge valve means tending to maintain said discharge valve in its closed position also acts to tend to maintain said bypass valve means in its open position.

6. The automatic water irrigation valve defined in claim 1, wherein said discharge valve means is longitudinally movable between said open position and said closed position.

7. The automatic water irrigation valve defined in claim 1, wherein said bypass valve means is longitudinally movable between said closed position and said open position.

8. The automatic water irrigation valve defined in claim 1, wherein said discharge valve means and said bypass valve means are connected together by longitudinal shaft means and are longitudinally actuable by said actuating means.

9. An automatic water irrigation valve comprising;
   an inlet port connectable to a source of pressurized water,
   a discharge port,
   a bypass port,
   globe valve means in said discharge port having a plug and seat longitudinally movable with respect to each other between an open position and a closed position, said globe valve means including a longitudinally movable actuating shaft,
   spool valve means in said bypass port movable between a closed position and an open position,
   means for selecting a predetermined volume of water to be discharged from said discharge port,
   means in said discharge port for measuring the volume of water discharged from said discharge port, and
   actuating means operatively connected between said volume measuring means and said discharge valve means to move said discharge globe valve means from said open position to said closed position and to move said bypass valve means from said closed position substantially simultaneously to said open position after said predetermined volume of water has exited said discharge port.

10. The automatic irrigation valve defined in claim 9, wherein said bypass spool valve means is directly connected to said actuating shaft so that said discharge globe valve means and said bypass spool valve means move together as a unit.

11. A system for automatic sequential water irrigation comprising;
    a plurality of automatic water irrigation valves arranged in series, at least one of said irrigation valves including;
    an inlet port connectable to a source of pressurized water,
    a discharge port,
    a bypass port,
    valve means in said discharge port movable between an open position and a closed position,
    valve means in said bypass port movable between a closed position and an open position,
    means for selecting a predetermined volume of water to be discharged from said discharge port,
    means in said discharge port for measuring the volume of water discharged from said discharge port,
    actuating means operatively connected between said volume measuring means and said discharge valve means to move said discharge valve means from said open position to said closed position and to move said bypass valve means from said closed position to said open position,
    said valve means in said discharge port and said valve means in said bypass port being cooperatively interrelated after setting said predetermined volume of water to preclude discharge of water from said bypass port until after a predetermined volume of water has exited said discharge port; and
    conduit means connecting the inlet port of each succeeding valve in the series to the bypass port of the preceding valve so that water flowing out the bypass port of the preceding valve enters the inlet port of the next valve of the series sequentially.

12. The automatic water irrigation system defined in claim 11, wherein the discharge valve means of at least one of said irrigation valves is so arranged in said discharge port that pressure upstream of said discharge valve means acts in a direction tending to maintain said discharge valve means in its closed position when said valve is closed.

13. The automatic water irrigation system defined in claim 11, wherein the bypass valve means of at least one of said irrigation valves is substantially pressure balanced in its closed position.

14. The automatic water irrigation system defined in claim 13, wherein each said discharge valve means of at least one of said irrigation valves is so arranged in said discharge port that pressure upstream of said discharge valve means acts in a direction tending to maintain said discharge valve means in its closed position and the bypass valve means of said one of said irrigation valves is substantially pressure balanced in its closed position.

15. The automatic water irrigation system defined in claim 11, wherein the discharge valve means and the bypass valve means of at least one of said irrigation valves are mechanically connected together so that said pressure upstream of said discharge valve means tending to maintain said discharge valve also acts to tend to maintain said bypass valve means in its open position.

16. The automatic water irrigation valve defined in claim 11, wherein said discharge valve means and said bypass valve means of each said irrigation valve are connected together by longitudinal shaft means.

17. The automatic water irrigation system defined in claim 11, wherein the discharge valve means of at least one of said irrigation valves is longitudinally movable between said open position and said closed position.

18. The automatic water irrigation system defined in claim 11, wherein the bypass valve means of at least one of said irrigation valves is longitudinally movable between said closed position and said open position.

19. The automatic water irrigation system defined in claim 11, wherein the discharge valve means and the bypass valve means of at least one of said irrigation valves are mutually connected together by longitudinal shaft means and longitudinally actuable by said actuating means.

* * * * *